United States Patent [19]

Johnson et al.

[11] 3,972,686
[45] Aug. 3, 1976

[54] DEVICE FOR LOADING CATALYST PARTICLES INTO A REACTION ZONE

[75] Inventors: James A. Johnson, Oak Lawn, Ill.; Hugh R. Wesler, Madison, Wis.

[73] Assignee: Universal Oil Products Company, Des Plaines, Ill.

[22] Filed: Jan. 31, 1974

[21] Appl. No.: 438,483

[52] U.S. Cl............................ 23/288 R; 214/17 CB; 239/687
[51] Int. Cl.².................... B01J 8/02; B65G 65/30
[58] Field of Search.......... 23/288 R, 288 G, 288 E; 214/17 C, 17 CB; 239/687, 681, 683

[56] References Cited
UNITED STATES PATENTS

| | | | |
|---|---|---|---|
| 2,670,946 | 3/1954 | Royster | 23/288 G X |
| 2,854,161 | 9/1958 | Payne | 23/288 G |
| 3,064,833 | 11/1962 | Von Ruden | 214/17 CB |
| 3,668,115 | 6/1972 | Uhl et al. | 208/143 |
| 3,804,273 | 4/1974 | Uhl | 23/288 R X |

Primary Examiner—Joseph Scovronek
Assistant Examiner—Barry I. Hollander
Attorney, Agent, or Firm—James R. Hoatson, Jr.; Thomas K. McBride; William H. Page, II

[57] ABSTRACT

A device for loading catalyst particles into a reaction zone which distributes said particles, at substantially the same rate, uniformly across the catalyst bed area of said zone. The catalyst particle loading device is employed in combination with a catalytic reaction zone. The catalyst particle loading device comprises a hopper having a conical bottom portion provided with an opening at its lower end. The opening is in communication with a catalytic reaction zone. A vertically movable hollow sleeve is coaxially disposed within the hopper. The sleeve has a lower conical end portion which forms with the conical bottom portion of the hopper a throttle valve for the opening. A rotary shaft is coaxially disposed within the sleeve and extends through the opening at the lower end of the hopper and into the upper portion of the reaction zone. A particle-dispersion wheel is attached to the lower end of the shaft below the opening.

4 Claims, 3 Drawing Figures

DEVICE FOR LOADING CATALYST PARTICLES INTO A REACTION ZONE

This invention relates to a device which loads catalyst particles into a reaction zone and which distributes said particles, at substantially the same rate, uniformly across the catalyst bed area of said zone and which provides for increased catalyst bed density.

In the past, catalyst has been loaded into a reaction zone by what is commonly referred to as the "sock" method. In this method, a hopper having an attached hose which extends to the bottom of the reactor or to the catalyst surface is utilized. The hopper and hose are filled with catalyst and the catalyst is released at the bottom of the hose by raising the hose slowly. The resulting catalyst bed is in the shape of a cone which, during the loading of the catalyst, can be distributed over the catalyst bed by raking. Commercial reactors varying in width from about 1 foot to about 15 feet, having lengths of from about 5 feet to 70 feet, are loaded by this "sock" technique. One of the problems that is associated with loading reactors by this method is that the catalyst bed can contain excessive catalyst voids which can, during the use of the catalyst, bring about catalyst settling problems, localized hot spots during the exothermic reactions of reactants and the necessity to utilize increased reactor volume. In addition, the "sock" technique requires increased times for loading a reactor since the hose through which the catalyst enters the reactor has to be continually adjusted upwardly in order to allow catalyst to flow. In addition to the above method, catalyst can be continually added through a hopper suspended above the catalyst surface which also results in the formation of a cone on the catalyst bed. As in the above method, the catalyst cone can be distributed over the catalyst bed by raking.

Thus, the settling of catalyst can change the overall volume of the catalyst bed thereby producing damage to equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of a reaction. Excessive voids in a sock-loaded catalyst bed cause poor gas, liquid, or gas-liquid distribution through the bed. This maldistribution often requires decreased throughput or increased temperatures, since the resulting catalyst utilization is low and product specifications may not be met. Settling problems associated with sock-loaded beds may result in damage to other reactor internals, such as baskets, redistribution trays, catalyst supports and quench spargers.

An additional problem associated with the prior art method of charging catalyst is that for a given reactor volume the amount of catalyst which can be charged is determined by the final catalyst density. Thus, a means for increasing the bulk density of catalyst present in a reaction zone would allow for increased throughput of reactants at the same severity or the same throughput at lower severity. Thus, more severe reaction conditions and/or increased throughput can be obtained for a given reaction zone volume if an increase in bulk density of the catalyst can be achieved.

It is, therefore, an object of this invention to increase catalyst utilization in catalytic reaction zones.

Prior art, viz., U.S. Pat. Nos. 3,718,579 and 3,668,115, teaches that catalyst utilization and bulk density is increased by a process for charging catalyst particles to a reactor which comprises charging to the reactor in downflow relationship to said reactor at an average free fall distance of the catalyst particles through a gaseous medium to the catalyst surface of at least about 1 foot and distributing the catalyst particles over the entire catalyst bed surface at substantially the same rate of fill.

Although the prior art is cognizant that the hereinabove described method will increase catalyst utilization in catalytic reaction zones, it has failed to visualize an actual device which can easily and most fully exploit such a method. The prior art has suggested a method for charging the catalyst to the reactor which is effected by allowing catalyst particles to flow by means of gravity from a conical hopper onto a conical diverter which is mounted in the hopper outlet. Although the diameter of the base of the conical diverter is to be adjusted to compensate for the reactor diameter, and although this diverter contains apertures through which a fraction of the catalyst may drop, it appears that the desired distribution of particles would not be obtained. With a modicum of imagination, the most casual observer will notice that it is highly unlikely that uniform distribution of particles will be achieved by merely dropping the particles upon a conical diverter. This inability should be especially apparent when the diameter of the reaction zone is 12 or more feet in diameter. And even with smaller diameter reaction zones, the probability that the deposition of particles upon the area directly below the conical diverter whose size will be maximized to distribute in the outer periphery of the catalyst zone will be at the same rate as the area without the penumbra of the diverter is slim. Therefore, if the desired distribution cannot be achieved, the benefits of such distribution will obviously not be enjoyed. In response to this dilemma, we have found a device which eliminates the above-mentioned infirmities and which permits true uniform distribution of catalyst particles in a catalytic reaction zone to yield a substantial improvement in bulk density approaching the maximum bulk density of the catalyst. In addition, the increase in bulk density produces a rigid catalyst bed with a substantially reduced tendency toward settling. Of additional importance is the fact that the invention provides for the preparation of a catalyst bed with minimum formation of catalyst fines. Thus, the formation of catalyst fines is in general below one percent based on the total volume of catalyst charged and generally below 0.5 percent by volume.

A particular advantage for the use of catalyst charged with the device of this invention is in various hydrocarbon conversion processes such as hydrogenation, reforming, hydrocracking, polymerization, hydrodesulfurization, dehydrogenation, etc., wherein such hydrocarbon conversion processes are carried out in a nonfluidized catalyst bed reactor, which includes fixed bed reactors and moving bed reactors. This invention is particularly advantageous with hydrodesulfurization, hydrocracking, hydrogenation and reforming processes. A particularly preferred application of this invention is with reforming and hydrogenation processes. The various process conditions of temperature, pressure and space velocity vary according to the process and such conditions include those well known to those skilled in the above-mentioned processes.

An additional advantage of increased bulk density of loaded catalyst is that catalyst life may be extended for the same throughput and severity. This extension of catalyst life is a result of the tangible effect of the increased weight of catalyst in a fixed reactor volume as well as the less tangible effect of uniform gas, liquid, or gas-liquid distribution which coincides with the more uniform voidage of a densely-loaded catalyst bed. Longer catalyst life results in a longer unit run length.

Furthermore, dense loading of all reactors in an integrated refinery would provide a means for predicting, controlling and optimizing the occurrence of turnaround, based on the premise that catalyst life in each reactor of the refinery network would become a predictable function of tangible factors such as catalyst properties, throughput and operating severity. Intangible effects associated with maldistribution, settling and hot-spots would be minimized by dense catalyst loading.

In a particularly preferred embodiment, the utilization of this catalyst loading device provides for an improved hydrogenation process wherein a hydrogenation catalyst is charged to a reactor with the present invention; then hydrogen and hydrogenatable organic material, for example, a petroleum hydrocarbon, are contacted with said hydrogenation catalyst and a hydrogenated organic material is recovered. Thus, the hydrogenation process of this invention provides for allowing more throughput at the same severity for a given reactor and for greater catalyst weight per volume of reactor. The increase in catalyst bulk density, therefore, allows for the construction and use of smaller and less expensive reactors for a given throughput.

Our device is used to charge catalyst particles to a reactor in downflow relationship to said reactor. In general, reactor sizes varying between about 1 to about 16 feet, preferably from about 2 to about 13 feet in diameter, and from about 5 to about 125 feet, more preferably from about 10 to about 75 feet in length can be charged. The rate of fill of the reactor can be non-uniform. However, it is preferred that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably an average free fall distance of from about 5 to about 125 feet and still more preferably from about 10 to about 70 feet. The gaseous medium in general is air, or depending on the catalyst, an inert medium such as nitrogen. Thus, in general the catalyst particles fall individually to the catalyst surface as the catalyst bed is formed. The catalyst particles are distributed over the surface area of the catalyst bed as it is formed such that the catalyst surface rises at a substantially uniform rate. The catalyst particles are distributed in order to produce a catalyst surface which has a difference between the highest portion of the catalyst surface and the lowest portion of the catalyst surface which is less than 10 percent of the diameter of the catalyst bed, that is a substantially flat surface, more preferably less than 5 percent and still more preferably less than 1 percent.

The term "rate of fill" implies the rise in bed height and may be expressed with units of feet per hour (ft/hr.). Another term, particle flux, is convenient to characterize the features of the loading speed and is defined as the pounds of catalyst particles dropped on an area of one square foot in one hour ($lb/ft^2$-hr.). It has been found that there is a certain particle flux most favorable for optimal loading of a given catalyst. Particle flux and rate of fill are related by the catalyst loaded bulk density:

$$\frac{\text{Flux, } \frac{lb}{ft^2\text{-hr.}}}{\text{Loaded ABD, } \frac{lb}{ft^3}} = \text{Rate of Fill, ft/hr.}$$

We have found that a flux between 100 and 1500 $lb/hr$-$ft^2$ is preferred for increasing the catalyst loaded bulk density, and that more preferable results are obtained for most catalysts using a flux between 300 and 1000 $lb/hr$-$ft^2$.

The above rates of fill, free fall distance and uniform distribution of the catalyst within the above preferred ranges are preferred since they provide for approaching substantially the maximum bulk density achievable for a given catalyst bed. The reactor sizes which are preferred are those reactors which, in general, are utilized in commercial processes such as hydrogenation, reforming and hydrocracking.

This invention is applicable to catalyst particles which are spheres, pills, extrudates, crystals, cylinders, etc. In general, the particle diameter should not be greater than 3% of the reactor diameter and, preferably with a diameter of from about 1/64 to about ½ of an inch, more preferably from about 1/16 to about ¼ of an inch. Catalyst particle diameter refers to the nominal particle dimension in the case where the particle is not spherical.

According to the present invention, the catalyst particles are loaded into a reaction zone utilizing a device which comprises in combination: (a) an elongated catalyst feed hopper in open communication at its lower end, with said reaction zone, having disposed therein; (b) a coaxially-disposed, ring-shaped sleeve movably connected to the interior wall of said hopper, the lower end of said sleeve terminating in a throttle valve; (c) a coaxially-disposed shaft rotatably connected to the upper end of said sleeve and extending through the center space thereof and through the end of said hopper into the upper portion of said reaction zone; and, (d) a particle-dispersion wheel attached to the lower end of said shaft.

Figure 1:
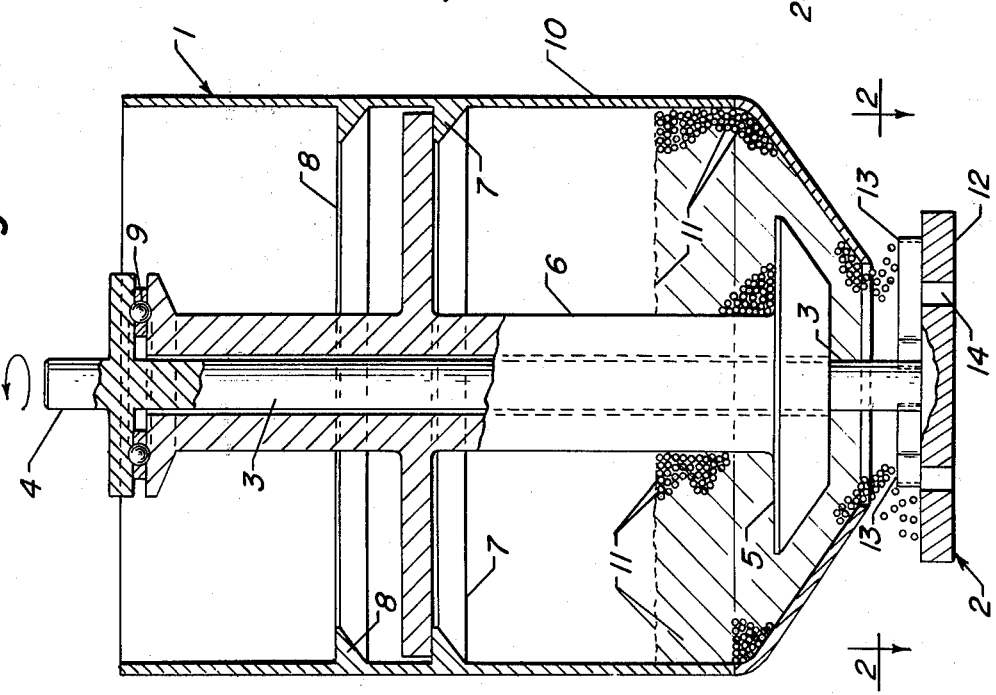
FIG. 1 is a longitudinal sectional view of the catalytic reaction zone loading device.

Referring to FIG. 1, a catalytic reaction zone loading device indicated generally at 1 includes a catalyst hopper indicated generally at 10 into which the catalyst particles 11 are dumped and stored prior to dispensing into the catalytic reaction zone. The catalyst hopper 10 is provided with a throttle valve actuator means 7 and 8 which is used to support the throttle valve actuator sleeve 6 at various adjustable elevations with respect to catalyst hopper 10. The lower end of throttle valve actuator sleeve 6 is provided with throttle valve 5 which effectively regulates in conjunction with the lower portion of catalyst hopper 10 the flow of catalyst particles from the catalyst hopper 10. At the upper end of throttle valve actuator sleeve 6, bearing 9 is provided to support dispersion wheel shaft 3. Dispersion wheel shaft 3 is rotated by dispersion wheel shaft driving means 4. Dispersion wheel shaft driving means 4 may be any convenient method for rotating dispersion wheel shaft 3 such as a variable speed motor which can be driven electrically, pneumatically or hydraulically. Dispersion wheel shaft 3 extends through the center of throttle valve actuator sleeve 6, and throttle valve 5, and into the area immediately below catalyst hopper 10. Dispersion wheel 2 is attached to the lower end of dispersion wheel shaft 3 in a location which permits the catalyst particles which are falling from catalyst hopper 10 to contact the dispersion wheel 2. The dispersion wheel 2 has a dispersion wheel disc 12 with dispersion wheel disc holes 14 and with dispersion wheel vanes 13.

Figure 2:
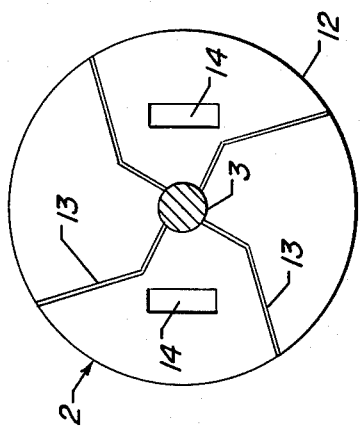
FIG. 2 is a plan sectional view taken on line 2—2 of FIG. 1.

FIG. 2 illustrates a plan view of a dispersion wheel 2 having dispersion wheel disc 12, dispersion wheel disc holes 14 and dispersion wheel vanes 13.

Figure 3:
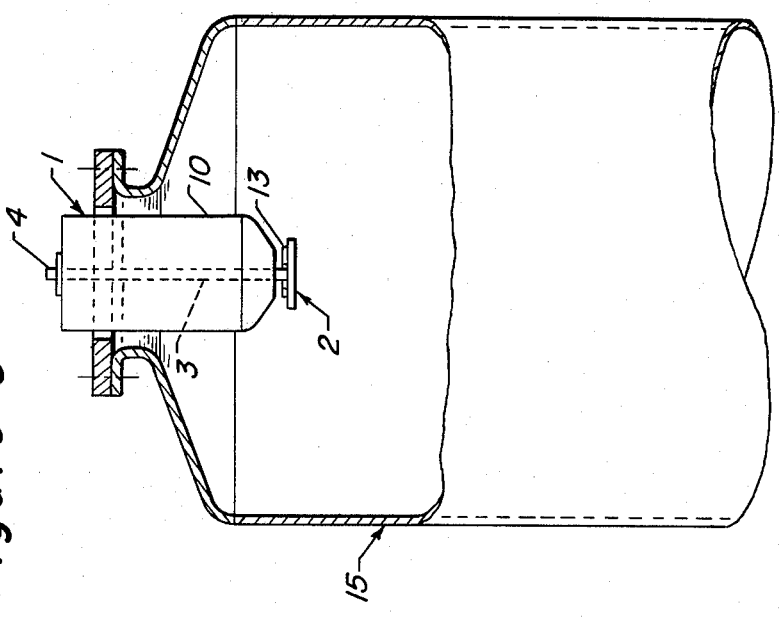
FIG. 3 is a longitudinal sectional view of a catalytic reaction zone with a catalytic reaction zone loading device in the preferred position.

FIG. 3 represents the placement of catalytic particle loading device 1 with respect to catalytic reaction zone 15.

A wide variety of solid catalysts may be charged to catalytic reaction zones with the device of the present invention such as oxidation, hydrodesulfurization, hydrocracking, cracking, reforming and hydrogenation catalysts. Typical examples of hydrodesulfurization catalysts comprise any of the transitional metals, metal oxides, metal sulfides, or other metal salts which are known to catalyze hydrodesulfurization reactions, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a Group VI-B metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate which actually may be a mixture of cobalt and molybdenum oxides wherein the atomic ratio of Co and Mo may be between about 0.4 and 5.0. This catalyst, or any of the above catalysts may be employed in unsupported form, or alternatively it may be suspended on a suitable adsorbent oxide carrier such as alumina, silica, zirconia, thoria, magnesia, titania, bauxite, acid-activated clays, or any combination of such materials.

Typical examples of hydrocracking catalysts are crystalline metallic aluminosilicate zeolites, having a platinum group metal (e.g., platinum or palladium) deposited thereon or composited therewith. These crystalline zeolites are characterized by their highly ordered crystalline structure and uniformly dimensioned pores, and have an aluminosilicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15, preferably 8 to 15 Angstrom units, when composited with the platinum group metal, and particularly after base exchange to reduce the alkali metal oxide (e.g., $Na_2O$) content of the zeolite to less than about 10 weight percent, are effective hydrocracking catalysts. Other suitable carrier or supports include acidic supports such as: silica-alumina, silica-magnesia, and other well-known cracking catalyst bases, the acid clays, fluorided alumina, and mixtures of organic oxides, such as alumina, silica, zirconia and titania, having sufficient acidic properties providing high cracking activity, and a mixture of support materials. Thus, for example, a zeolite and an alumina can be blended together as a support material in varying proportions which support materials contain various metals deposited thereon.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally it is preferred that an oxide or sulfide of a Group VIII metal (particularly iron, cobalt or nickel) be present in mixture with an oxide or sulfide of a Group VI-B metal (preferably molybdenum or tungsten). A suitable support is alumina.

Typical dehydrogenation or reforming catalysts are alumina, having a platinum group metal component deposited thereon or composited therewith. Particularly active reforming catalysts also contain one or more components selected from the group of tin, rhenium and germanium.

The following examples are presented for the purpose of illustrating the beneficial effects of a device for loading catalyst particles into a reaction zone. It is understood that the present invention is not intended to be limited, beyond the scope and spirit of the appended claims, to the operating conditions, catalysts and reaction zone configuration as utilized within the examples.

EXAMPLE I

A two foot diameter vessel was selected to be loaded with 1/16 inch diameter alumina catalyst spheres by means of the conventional prior art method of "sock" loading which is hereinabove described and also by means of the loading device of the present invention to compare the ability of the two methods to maximize the apparent bulk density (ABD) of the loaded catalyst. The catalyst particles loaded with the prior art "sock" method had an apparent bulk density (ABD) of 0.499 g/cc., while the catalyst loaded with the device of the present invention demonstrated an ABD of 0.534 g/cc. This increase in ABD is a 7.1% increase over the prior art method. The comparison of the catalyst loading methods of this example is presented in the following Table I.

TABLE I

| Apparent Bulk Density (ABD) Comparison For 1/16" Diameter Spherical Catalyst Particles | | |
|---|---|---|
| Catalyst Loading | | |
| Sock Method | Device Of The Present Invention | Increase In ABD, % |
| ABD, g/cc.    0.499 | 0.534 | 7.1 |

EXAMPLE II

This example utilized the same vessel and loading techniques as those of Example I. However, the catalyst particles selected for use in the example were 1/32 inch diameter extrudates which had a length to diameter ratio of from about 6.5 to about 8. The ABD of the extrudate catalyst which was loaded by the "sock" method and the loading device of the present invention, was found to be 0.589 g/cc. and 0.652 g/cc., respectively. This increase in ABD represents a 12.4% increase over the prior art method. The comparison of the catalyst loading methods of this example is presented in the following Table II.

TABLE II

Apparent Bulk Density (ABD) Comparison
For 1/32" Diameter Extrudate Catalyst Particles

| | Sock Method | Catalyst Loading Device Of The Present Invention | Increase In ABD, % |
|---|---|---|---|
| ABD, g/cc. | 0.589 | 0.652 | 12.4 |

The foregoing examples and description illustrate the present invention and the benefits afforded through the utilization thereof.

We claim as our invention:

1. In combination with a catalytic reaction zone a catalyst particle loading device comprising:

a. a hopper having a conical bottom portion provided with an opening at its lower end, said opening communicating with said catalytic reaction zone;
   b. a vertically movable hollow sleeve coaxially disposed within said hopper and having a lower conical end portion forming with said conical bottom portion of said hopper a throttle valve for said opening;
   c. a rotary shaft having means for rotating said shaft connected thereto, said rotary shaft being coaxially disposed within said sleeve and extending through said opening at the lower end of the hopper and into the upper portion of said reaction zone; and
   d. a particle-dispersion wheel attached to the lower end of said shaft below said opening.

2. The device of claim 1 further characterized in that said shaft is driven by a variable speed motor connected thereto.

3. The device of claim 1 further characterized in that said particle-dispersion wheel is a circular plate having a plurality of holes and having a plurality of radial vanes.

4. The device of claim 1 further characterized in that said shaft is supported by said sleeve with a friction-reducing bearing.

* * * * *